ns patent [11] 3,565,241

[72] Inventors Russell L. Race
 Greenville;
 Donald E. Brown, Belding, Mich.
[21] Appl. No. 765,392
[22] Filed Oct. 7, 1968
[45] Patented Feb. 23, 1971
[73] Assignee Clark Automation, Incorporated
 Belding, Mich.

[54] WALKING BEAM TRANSFER APPARATUS
 9 Claims, 6 Drawing Figs.
[52] U.S. Cl. .................................................. 198/219,
 198/20
[51] Int. Cl. ...................................................... B65g 25/04
[50] Field of Search ............................................ 214/6 (K);
 198/20, 219, 34; 53/159

[56] References Cited
 UNITED STATES PATENTS
1,139,027 5/1915 George .......................... 198/219
2,915,202 12/1959 Aitken ........................... 214/6K Primary Examiner—Richard E. Aegerter
Attorney—Wolfe, Hubbard, Leydig, Voit & Osann ABSTRACT: A transfer apparatus of the kind using walking beam structures in which traveling articles are moved intermittently in stepwise fashion from a first station toward a second station. The stepping or walking beam is devised in two sections: a first principal liftover element of the beam, and a second leading portion thereof which is extensible from the first main portion. The entire combination of both elements is herein styled a "composite" walking beam. During the walking or liftover operation, transferring articles walk toward the extensible member of the walking beam upon which they are collected and are ultimately bunched together if a sufficiently large number of such articles are so collected. The extension member of the beam structure is adapted to be selectively rapidly advanced or extended from the leading end of the beam apparatus in a relatively rapid fashion so that the extensible beam executes a rapid forward traverse. For this reason, the extensible portion is alternately referred to as a traverse beam or traverse element, and it is linked to control means which automatically initiate the forward traverse at a predetermined point in the walking cycle of the composite liftover beam. The traverse is initiated at such time as a desired number of articles have been collected for quick traverse, en masse, to the object station. The central feature of the structure is the absence of continuous interdigitation of the composite walking beam members with the leaves or fingers of an object table or station. Rather, in the instant disclosure, the composite beam step transfers articles from a source station to a point somewhat short of the object station and then, at predetermined or selected time intervals, groups of articles are darted forwards on the above-mentioned rapid traverse elements, for transfer of the entire article group onto the object station. Then the rapid traverse element is equally rapidly retracted and the normal walkover motion of the composite beam resumes until a collection of objects is again accumulated for a group transfer.

WALKING BEAM TRANSFER APPARATUS

BACKGROUND OF THE INVENTION

Walkover transfer mechanisms have been well known for a long time. Such mechanisms normally employ what is commonly referred to as an interdigitated system in which walking fingers or beams describe a closed curve movement between the leaves of a stationary platform for the conveying articles, namely, a transfer support table. Part of the path of the finger motion occurs above the support leaves of the table, the other portion being executed below the table. Thus, in a stepping fashion; the beams lift elongate articles in a stepwise fashion along the leaves or slats of the support table, from one end thereof toward the other. The walk beams are interdigitated not only with the table seats but, one or both beam ends are interdigitated with source and/or object stations, objects being taken from the source and walkingly conveyed to the object or delivery station or table. Thus the walking of the objects is executed in a continuous stepwise cycle proceeding from a source station toward, and ultimately onto, the object station, which also is normally comprised of some sort of elongate article supporting table or platform.

A particularly appropriate background for the present invention is that of mechanisms for handling elongate aluminum extrusions. The extrusion industry experiences special problems in the handling of the extrusions as they are taken from the extruding dies, inasmuch as they exit therefrom in a most difficult to handle state. The extrusions, immediately upon exiting from the dies, are normally found in a hot and less than rigid physical state. The extrusions are often relatively long, thin elements, of channelform cross section, and are in a state of internal stress which causes the extrusion to behave in a peculiar fashion. As the extrusions are received from the dies they have a pronounced tendency to warp, damage, twist, etc. In order to minimize this undesirable behavior, the extrusions are handled during this initial period with delicacy, in order to allow the extrusions to cool, and in order to avoid agitation of the extruded members during the period in which they are so susceptible to the aforementioned deleterious deformations. Experience has determined that liftover apparatuses in the nature of those already described, best facilitate the transfer of such ill-behaved hot extrusions, without undue deformations thereof, and therefore without the necessity of an inefficient time delay in the conveyance of the extruded articles, allowing them to cool, before transferring.

One objectionable feature, in some applications, is the interdigitation of the walking members of an aforementioned type of apparatus, with source and/or object platforms. Thus, if such a liftover apparatus is utilized, as it would normally be, to transfer elongate articles in a lateral direction from one conveyance or support structure to a second or object station or platform, the walking beams must walk "through" the object platform slats. That is to say the walking beam is normally interdigitated with the object platform or table in the same manner in which it is interdigitated with the crossover table. In modern industrial applications, the object platforms are often not simply stationary tables, but instead constitute conveyances of one sort or another. For example, in specific settings for the present invention, the crossover apparatus is situated for transfer of extruded articles from a runout table (which receives the extrusions from a diehead) to a saw feed table which operates in a direction substantially parallel to that of the runout table, but at some distance spaced sidewise apart therefrom. A lateral transfer is necessary to shift the extrusion from the runout table to the saw feed table, and the walking apparatus is the expedient for so doing.

As already mentioned, heretofore known devices for such an application necessitated the interdigitation of the walking apparatus with each of the extrusion conveyances (i.e., the runout table and the saw feed conveyance) so that the walking apparatus invaded the runout tables, between the fingers or slats thereof, so as to effectuate a liftoff and redeposit of the extrusions. Walking crossover structures are utilized for this transfer operation, for the achievement of a slow, gentle, uniform transfer of the temperamental extrusions. The lateral operation of an interdigitated type of liftover mechanism interferes with the runout operation of the runout tables. An analogous interference occurs in the exchange of an extrusion from the walking beam cooling table to the object table or conveyance (more particularly the saw feed table). In the particular case of the saw feed the problem arises as follows: The transversely invading motion of the walking bean structure interrupts a continuous feeding operation on the saw feed table.

It would be more advantageous to the saw feed operation were it possible to delay the advancing extrusions on the walking beam apparatus until a complete sawing operation has been completed. At such time a collection of extrusions could be exchanged from the walking operation onto the saw feed table, whereupon the walking beam apparatus would continue advancing extrusions toward the saw feed conveyance albeit delaying their exchange thereto until such is called for by an appropriate initiating signal. This timing liberates the saw feed conveyance for continuous operation without transverse interference from the walking crossover apparatus. It is precisely this above-hypothesized apparatus which is now provided by invention; and the aforementioned problems are resolved thereby.

SUMMARY OF THE INVENTION

My approach to the above-described problem has been to provide auxiliary extensions on the foremost, or leading, ends of the ordinary walking beam structures. The resulting "composite" beams are thus formed in two portions, the foremost or auxiliary element being extensible from the main element. The major portion of the time these composite beams operate merely as one single, integral walking beam, with the extrusions advancing toward the foremost end thereof; however, the foremost extensible portion (the traverse beam) does not normally project so as to interferingly invade the region of the receiving saw feed conveyance table. Thus, although the walking beam continuously advances extrusions toward the saw feed conveyance, the extrusions, in this state of operation, do not actually reach the saw feed conveyance. Instead, the foremost extension elements of the walking beams are provided with stop gates, and after sufficient operation time the advancing extrusions begin to collect against the stop gate and bunch together. At such time as the saw feed table has been cleared, its operation on a group of one or more extrusions being completed, then and only then, a signal is given to the composite walking beam apparatus to actuate a forward extension of its traverse beam portion: Actuation of the traverse beam effectuates an extension of the entire composite walking beam such that the composite beam is effectively extended to interdigitate with the discontinuous slats of the saw feed conveyance. Now, execution of the walking cycle of the beam effects an exchange of the extrusions collected on the traverse beam, onto the saw feed conveyance. After the liftover, a second signal initiates retraction of the traverse element of the composite beam so that it no longer intrudes between the slats or rollers of the saw feed conveyance, but rather resumes collection of extrusions for a subsequent liftover as already described. The saw feed apparatus then proceeds to resume its feeding operation without interruption by the walking crossover apparatus. It should be appreciated that the saw feed conveyance is thereby freed more efficiently to operate on a plurality of extrusions simultaneously. Since a certain time period is necessary to perform the normal saw feed operation on the extrusions, it is desirable that the walk-across operation be temporarily interrupted to permit longitudinal saw feeding of the extrusions on the saw feed structure. It is precisely this beneficial result which may my invention accomplishes, while at the same time maintaining the average crossover rate of extruded members from the runout table to the saw feed apparatus, or other operation stations. It is important also to realized that the operator of the saw feed table may, with the system of this invention, call for delivery of the aluminum articles at his choosing, and need not be hampered by unwanted interaction of the crossover equipment.

Accordingly, the objects of my invention are as follows:

To provide an interrupted cycle walk-across apparatus.

To provide walk-across equipment in which deposition of the walking articles onto the object station may be delayed for a selected time sequence.

To provide a walk-across structure having an interdigitated walking apparatus, wherein interdigitation of the walking beam with the object platform is intermittent, so as to minimize interruption of the operation of the object station.

To introduce a extendible walking composite beam crossover apparatus between an aluminum extrusion runout table and a secondary operation, in which the efficiency of the secondary operation is greatly increased by minimization of its interaction with the crossover mechanism.

To provide an extrusion feed apparatus which greatly increases the efficiency of adjacent cooperating extrusion operations.

The provision of a greatly improved extrusion collecting crossover apparatus.

A further object of this invention is to reach a nonintegral composite walking beam construction, in which one element thereof comprises a rapid traverse beam.

A still further object of the present invention is to provide an extrusion-collecting device in the form of a rapid traverse beam element associated with a normal walking beam element for selected nesting and/or bunching of the advancing extrusions on the walking extrusion conveyance.

Still other objects of the present invention will be apparent from the present description, drawings and claims.

DESCRIPTION OF PREFERRED EMBODIMENT

Figures 1, 6:
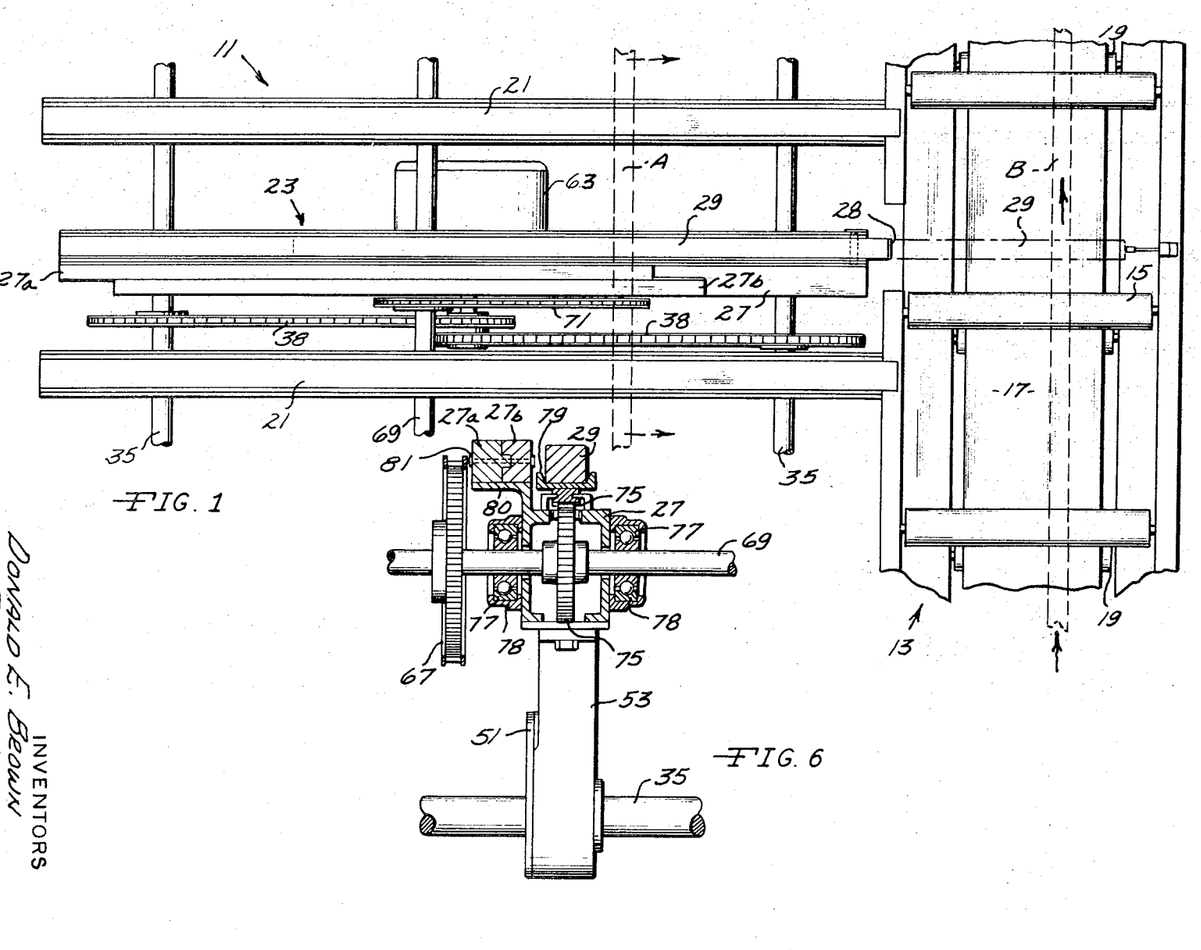
FIG. 1 is a top plan view of an operative portion of the composite walking beam apparatus of the present invention, shown in cooperative relation with the object station of an extrusion-receiving conveyance oriented to feed substantially perpendicularly to the walking beam mechanism, and shows in broken line the alternate position of the traverse beam portion of the composite beam.
FIG. 6 is a sectional view taken on line 6-6 of FIG. 4 and shows in section an end elevation of the composite walking beam apparatus and depicts the adjacent, separately movable nature of the main beam and the traversing beam, which function both independently and compositely; also shown are the beam drives, both the eccentric for walking drive and the shaft-mounted gear drive for the traverse beam.
Figure 3:
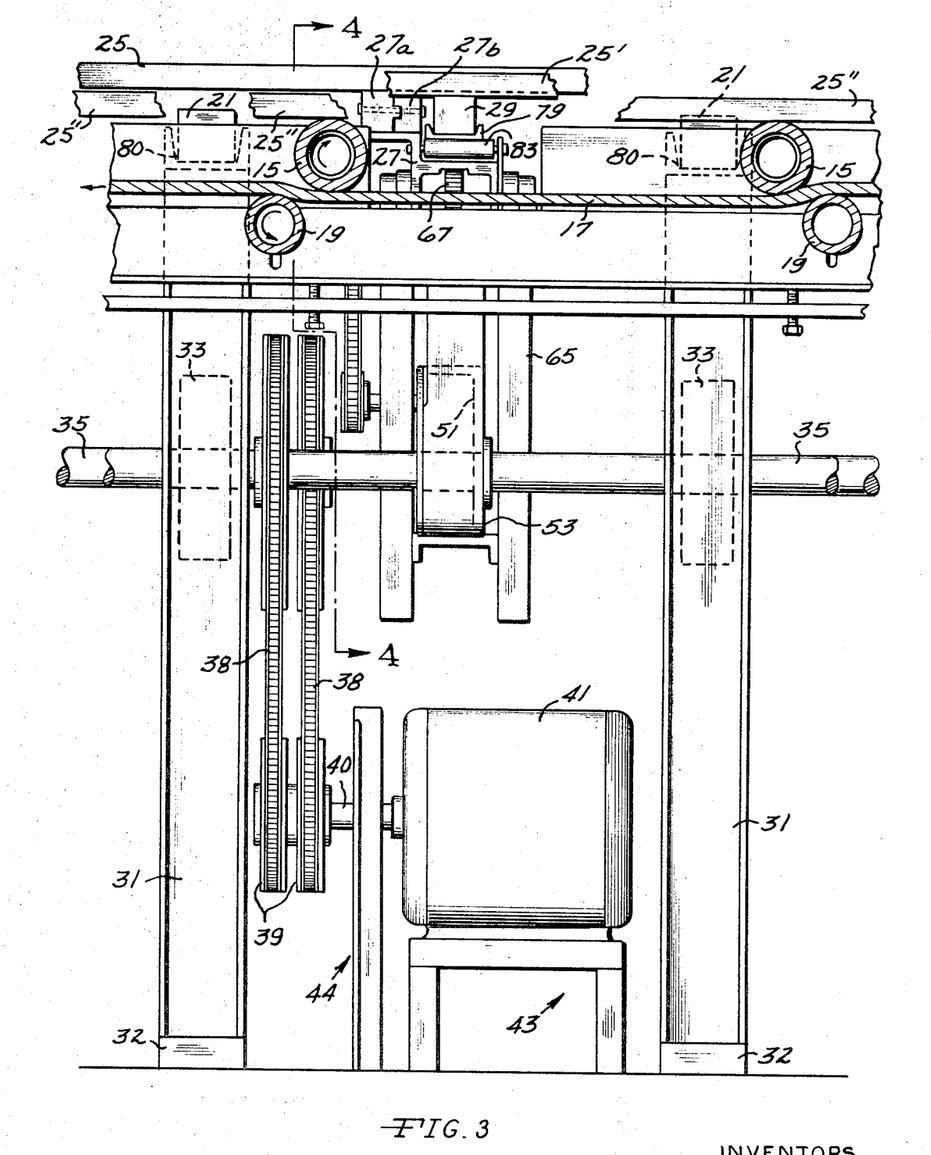
FIG. 3 is a sectional view of the apparatus of FIG. 2 taken at section line 3-3 thereof and shows the positive belt drive mechanism of an extrusion-receiving conveyance, and more specifically a saw feed table where the upper rollers motivate the extrusions and the belt shown in section is frictionally engaged to drive the rollers by the auxiliary idlers revolving in the opposite direction below the drive rollers, with the belt moving in the direction of the arrow. Also seen is the end view of the composite beam drive structure.

Referring now to the figures in FIG. 1 is seen the general walkover or crossover structure 11, oriented for transportation of articles toward an object or destination station 13. In this particular case, the object or destination station or platform 13 is an aluminum extrusion saw feed table having rollers 15 driven by the drive belt 17 which is frictionally engaged with each extrusion roller by pressure rollers 19, and which will be better appreciated later by reference to FIG. 3.

The general operation of the entire mechanism seen in FIG. 1 is such that extrusions move in the direction of the arrows associated with the phantom line illustration of the walking extrusion A. The ultimate disposition of the extrusion at position A, is that shown at the phantom line position B, from whence the extrusion is then carried away in the direction of the arrows shown, in a right-angled relation to the direction of approach on the walkover device 11. Normally the extrusion is received onto the crossover 11 from a source station, as a platform or in the setting of the present invention, an extrusion runout table (not shown) which moves the extrusions in their longitudinal direction as they exit from the extruding dies (also not shown). The walkover apparatus 11 is normally related to the runout table in an interdigitated fashion, well known to the conveying art with the runout table oriented substantially parallel to the saw feed table or other object station 13, such that the walkover apparatus 11 transports the extrusions in a lateral or sidewise direction between the source and object stations 13. This also accomplishes an important purpose of allowing the extrusion to cool while being laterally shifted from the runout table to the saw feed table. This invention, as already described, is primarily concerned with the relation between the crossover cooling table apparatus with the object station as exemplified therein by the saw feed table 13. It should be realized, however, that the application need not be limited to aluminum-handling equipment. Moreover various aluminum-handling equipment might be served by this crossover apparatus 11, for transferring from extrusion-stretching gear, detwisting, or the like, to a storage table, or equipment other than a saw feed.

Only single elements of the crossover cooling table 11 are shown, for example, the stationary cross slats 21 and the composite walking beam structure 23, although both of these structures normally occur in interdigitated multiplicities, as necessary. The depicted structure of one composite walking beam 23 between a pair of cross slats 21 is completely sufficient for an understanding of the present invention.

Figure 2:
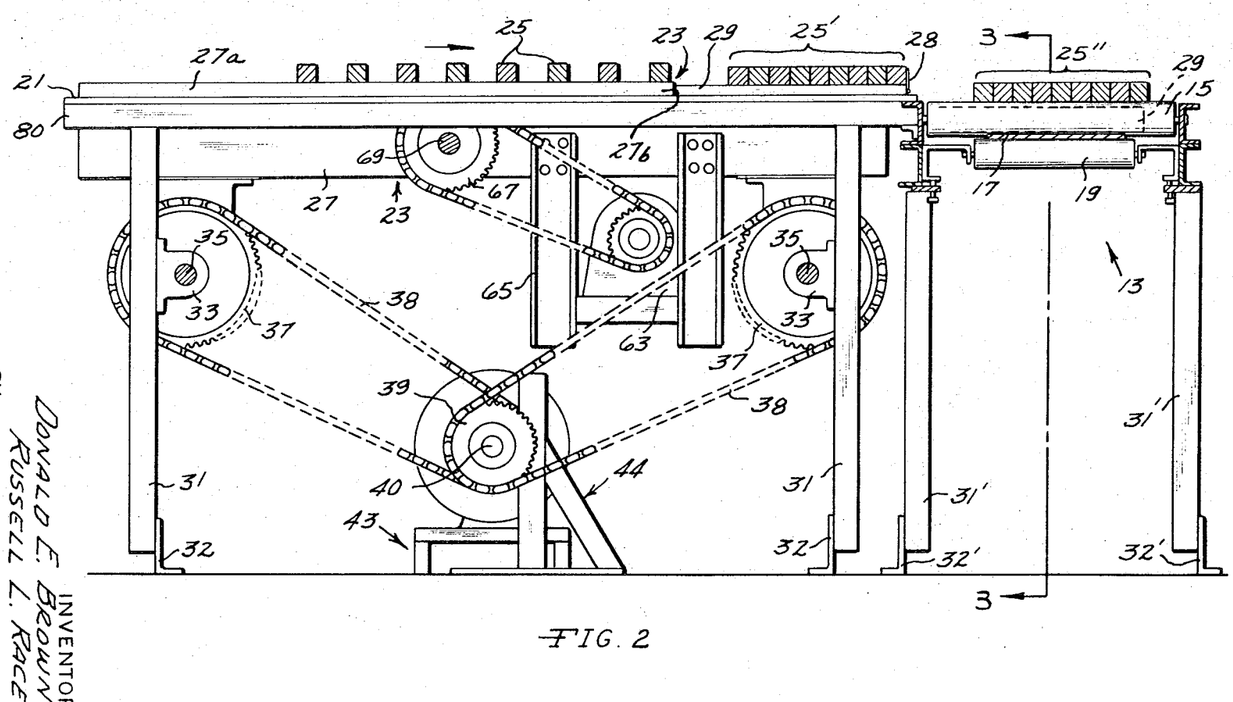
FIG. 2 is a side elevation view of the apparatus shown in FIG. 1, and includes a series of aluminum extrusions shown advancing in the direction of the arrow on the walking beam mechanism, some of which are shown as collected against the stop gate at the end of the traverse beam member of the composite walking beam, and others shown subsequent to their exchange onto the saw feed table.

Reference is now made to FIG. 2, for a more complete description of the apparatus of FIG. 1. Extrusions 25 are seen in spaced relation with their direction of motion shown by the arrow across the walkover table 11. The extrusions 25 are seen as supported on the leg 27a—27b (best seen in FIG. 1) of the two-legged composite beam 23, and shown at a more advanced stage by the extrusions 25'; nested together against a hinged stock gate 28 at the end of the second leg or traverse beam 29 of the composite beam 23. Further advance of the extrusions 25' delivers them to the saw feed table 13 where they rest upon the rollers 15 as shown by the still nested group of extrusions depicted in the final, crossed-over position at 25''.

The crossover table structure 11 is now to be described in more detail. The crossover structure 11 is supported on vertical legs 31, normally affixed to a floor by brackets 32. The stationary cross slats 21 are supported on the legs 31, upon the vertical faces of which can be seen pillow block-type bearings 33 in which are journaled the drive shaft 35 that delivers the walking motion to composite bean 23 at the main frame portion 27, thereof. Keyed to these shafts 35 are the chain sprockets 37 driven by chains 38. FIG. 2 also shows the main drive support structure which includes motor base platform 43 and shaft-bracing structure 44. In actual practice the main drive motor 41 may be substantially offset from the positions shown and centered between the sprocket shafts 35. In such case (not shown) the moor drive shaft is provided with a special sprocket and the shaft 40 is independently mounted as a jackshaft on the support 44, in the centered position; and an extra sprocket is provided on the jackshaft to be driven by a third chain (not shown) between it and the main drive motor 41. Whether this arrangement, or the one shown, is used is not of contributory importance to an understanding of the present invention.

The saw feed structure is supported on legs 31' and brackets 32'.

Figure 4:
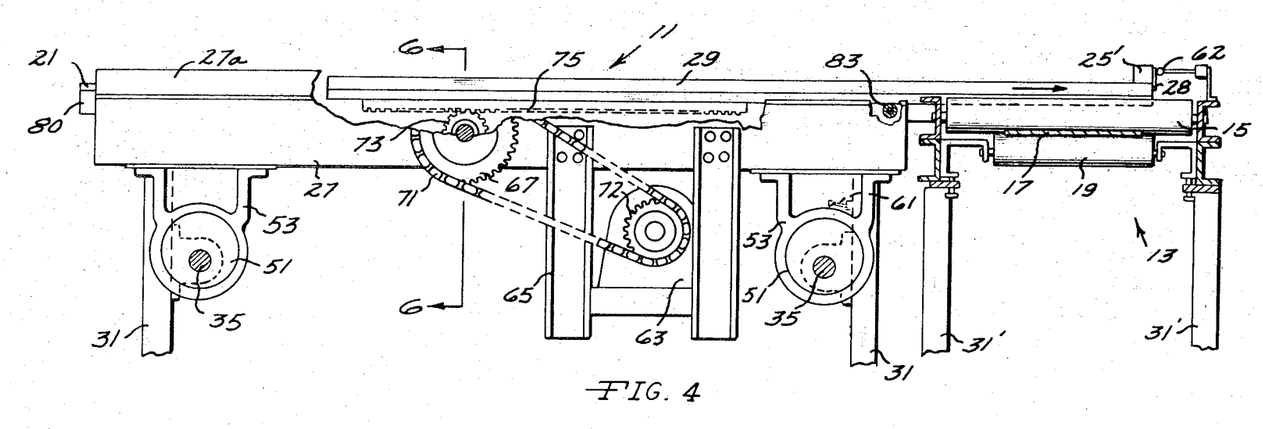
FIG. 4 is a partially broken away sectional view of the present invention taken on the line 4-4 of FIG. 3 showing the eccentrics each of which is driven by a separate takeoff chain from the main drive motors and impart the cyclical walking motion to the composite walking beam; the broken away portion of the figure showing the rack and pinion drive of the traverse beam element; and limit switches being shown, one for initiation of the traverse beam extension cycle, and the other being for reversal or retraction of the traverse beam.
Figure 5:
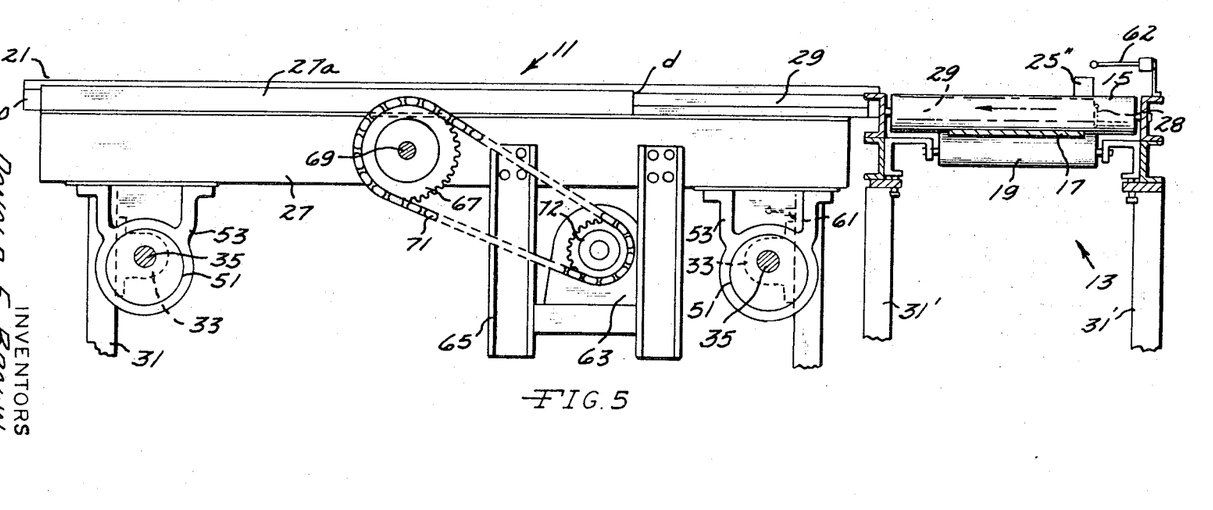
FIG. 5 is a side elevation view of the structure shown in FIG. 4, with the exception that the walking structure is in the down point of its cycle and the traverse beam is shown in the reversed or retracted part of its cycle having moved back in the direction of the arrow.

The FIG. 5 gives a less cluttered view of the subject matter of FIG. 2, with a chain drive motor structure removed as well as the proximate pair of legs 31; this reveals eccentrics 51 which are mounted to turn on shafts 35 inside the eccentric hanger housings 53. The hanger housing 53 depends from, and upwardly supports the main frame 27 of the composite beam, and it can readily be seen that rotation of shafts 35 (synchronized by virtue of their connection to common drive shaft 40) causes the eccentric housing 53 to describe a rotational motion while remaining in a fixed attitude, because the housing is freely rotatable about the eccentrically mounted member 51. Thus the composite beam 27 describes a substantially circular motion such that composite beam 27 oscillates between an advance and a retracted position; as well as an upper and lower position. This can be seen by reference to FIG. 4 (which shows the walking composite beam in its upper or raised position above the stationary slats 21 in heavy line) and FIG. 5 (which shows the lower or descended position below the stationary slats 21 in phantom line). This up-down motion accompanied as it is by a simultaneous advance-retreat (back and forth) motion of the entire composite walking beam structure, clearly lifts any crosswise-disposed free objects from the slats 21, advances them some distance and then descends below the slats 21 to redeposit the objects on the crossover table, only to be again picked up and advanced a short step again as the walking cycle continues. Such a walking apparatus as thus far described is presently known to the conveyancing art.

In Fig. 4 is seen an extendible portion 29 of the main walking structure 11 which normally cycles in rigid conformance to the cycling of the main composite beam structure 27, as though it were an integral portion thereof. Assuming this condition it can be seen that the extensible portion 29 cycles up and down with respect to the saw feed table, to alternate positions above and below the upper surface of the rollers 15 thereof, as is clearly seen by the previous consecutive reference to FIGS. 4 and 5. FIG. 5 shows the extension or traverse beam 29 below the saw feed rollers 15. The saw feed table structure 13 is indented or otherwise open between rollers 15 so as to permit this invasion of the saw feed table area in the interdigitated fashion which may be best appreciated by reference again to FIG. 1 which also shows the extension member 29, in phantom line, between a pair of the saw feed table rolls 15. Thus, normal cycling of the apparatus as already described would normally advance extrusions 25 as seen in FIG. 2 continuously in the spaced-apart relation shown at 25 until they collect on the saw feed table 13 where they would normally still be spaced apart, unless nested by some backstop mechanism, or the like. It is precisely this fashion in which most known walking beam structures operate.

However, for reasons already described above in Background of the Invention, it is desirable to avoid the continuously interdigitated relation between the walking beam structure 11 and the object table or saw feed structure 13. The main consideration for desiring to eliminate this feature, is that the operator of the saw feed table may function much more efficiently and economically if the saw feed table can collect one or more extrusions in a bunch and then operate on them in the same fashion without interference or invasion of the saw feed table by the walking beam. Thus the walking beam may continue cycling and thereby advancing extrusions 25, yet not invading the saw feed table 13 and thereby leaving it free for continuous uninterrupted saw operation until some predetermined time at which it is desired to transfer one or more of the extrusions 25' from the crossover apparatus to the saw feed table.

It is just this result that my invention accomplishes by providing a composite beam in two portions, the main portion 27 with upper support platform in two parts 27a and 27b (See FIG. 5) and a second extensible member 29 which normally does not invade the saw feed table until such time as it is desired by the saw feed operator to deliver additional extrusions to the saw feed table rolls 15, which have presumably been cleared to receive a new arrival of extrusions. This result is accomplished by a properly timed extension of the auxiliary portion 29 of the composite walking beam, when the saw feed table 13 is prepared for an additional receipt of extrusions, and at such time as the member 29 has collected a sufficient or desired number of extrusions 25', which normally would have been collecting in the nested relation shown in FIG. 2 against the releasable stop gate 28 (shown projecting upward from the end of the member 29).

The exact timing of the motion of the member 29 is as follows: at some point when the composite structure 27a —27bis at, or very near, to the uppermost point of its walking cycle, the member 29 is rapidly extended forwardly in a direction shown by the arrow in FIG. 4, to the position there shown. This relatively quick forward movement of the member 29 is in the nature of a forward traverse and consequently this member is referred to as a traverse beam 29. Advance of the traverse bean 29 occurs through tripping of the traverse advance switch 61 which is so mounted to leg 31 (or any other such stationary structure) so as to be tripped by some cycling portion of the composite beam structure such as the eccentric housing 53 (see FIG. 4). Reverse or withdrawal of the traverse beam 29 is initiated by contact of the traverse beam structure (e.g. stop gate 28) with the reversing switch 62 mounted on the cable structure 13. Reversal is as shown in the direction of the arrow in broken line in FIG. 5, as would be expected, and is delayed slightly so as to permit the walking cycle to carry it completely below the upper surface of the rollers 15 prior to the retraction of the traverse beam 29. This permits proper deposit of the articles, i.e. the extrusions 25'', on the saw feed table 13 without a drag back of these members by the traverse member 29.

Moreover at the same time as the traverse member 29 commences to withdraw from the extension position, the stop gate 28 is released to drop to the lower position as seen in FIG. 5 in broken line. This drop-down of the stop gate 28 also guards against any drag back of the extrusions 25'' from the deposit platform, i.e., the rollers 15 of the saw feed table 13.

A separate reversible drive motor 63 for motivation of the traverse beam, is mounted on the hanger frame 65 from the main frame of the walking composite beam 27, to which is also supportably connected the traverse beam drive sprocket 67 on shaft 69. As will be appreciated other motors or lineal actuators may be used such as hydraulic, pneumatic, or electrical direct drive systems well known in the art. This drive sprocket is driven off from the motor 63 by the drive chain 71 connected to the motor sprocket 72, the drive sprocket 67 having a secondary pinion gear portion 73 which drives the traverse beam 29 to or fro by engagement with the rack portion thereof 75 (see FIG. 4). The shaft 69 extends to some indeterminate length in either direction from the drive sprocket structure so as to connect up with other traverse beam members, depending upon the width of the crossover table, which width conforms substantially to the length of the extrusion members being conveyed or transferred. Similarly of course, the walking shafts 35 extend away to connect with other composite walking beam structures (not shown) between other cross slats 21 on the crossover table, the number dependent upon the length of extrusions 25 served.

Details of the construction for driving the traverse beams are best appreciated by reference FIG. 6. The sprocket shaft 69 is seen journaled in ball bearing 77 which in turn are mounted in housings 78 attached to the movable main frame 27 of the composite beam structure. Drive pinion 73 is seen engaging the drive rack 75 on the bottom portion of the channel member 79 into which the traversing support beam 29 is attached. The extrusion-supporting portion of the walking beam is split into two mutually adjustable beam halves 27a and 27b, the second of which is tongue and groove fitted into the first and is slidable thereon, in a tracked fashion, to any desired point of extension and tightened thereat by the threaded restraining bolt and nut structure 81. One of these extendible members is slotted (not shown) in which slot the restraining bolt 81 moves to permit relative motion of the sliding member 27a with respect to the bolt 81. Comparison of the principal walking support member 27a —27b with the traverse beam 29, reveals a slight height differential therebetween (which can be seen by reference to any of the FIG. 1 through 6) which differential is deliberately provided so as to cause only the appropriate selected extrusions 25' to pass to the saw feed table 13 upon advance of the traverse beams 29.

Both the principal walking support beam 27a —27 b and the traverse beam 29 may have upper surfaces formed of a contact layer of graphite (not shown) if desired, so as to provide a superior surface for extrusions 25 which are still hot when received from the extruding dies.

Referring again to FIG. 6, it can be seen that the main frame of the walking beam structure is formed in a split box cross section which provides an appropriately sized and designed structure for supporting and partially partially housing the traverse beam drive sprocket 63, shaft 72, bearings etc., all of which must be supportably attached to the walking structure. Also provided upon the walking beam structure is a forward support roller 83 (see FIG. 4) upon which the forward portion of the traverse beam 29 rests in a level guide frictionless relation.

Both principal and traverse beam portions are of wood structures which are separably connected to the metal support channel members 78 and 80 respectively.

OPERATION

In operation one or more extrusions are alternately lifted and set down by the walking cycle in stepwise fashion proceeding in the direction of the arrow, and forming a group of extrusions 25 as seen in FIG. 2. Extrusions are, as already described, repeatedly picked up and set down at a somewhat advanced position so as to be forwardly stepped along on the permanent cross slats 21 of the walkover table structure 11. These slats are arranged in a parallel plurality, so as to form racklike stationary structures, the surfaces of which are normally adapted to receive hot extrusions without interacting with the hot metal, and may therefore be formed of graphite previously mentioned. This group of extrusions 25 eventually arrives one by one at the end of the principal walking platform 27b and transfers onto the traverse beam 29, which is seen at d in FIG. 5 to be slightly down stepped from the main walking platform 27a—27b, somewhere in the neighborhood of one-eighth inch to one-fourth inch, the purpose of this down step being pointed out below. Eventually these advancing extrusions, after passing onto the traverse beam 29, encounter the stop gate 28 on the end of the traverse beam 29, and as walking motion continues they step together into a nested relation of extrusions 25'. At the option of the saw feed table operator, a switch 61 (see FIG. 4) is tripped which upon the next up cycle of the walking beam apparatus initiates forward traverse of the beam 29 into the extended position shown.

At the forward limit of the travel of the traverse beam 29 the stop gate 28 actuates the second limit switch 62 which initiates reversal of the traverse motion. Reversal is, however, slightly delayed through appropriate circuitry so that actual return of the traverse beam does not occur until the walking cycle has dropped the beam below the upper surface of the saw feed rollers 15, as seen in FIG. 5, whereupon the extrusions 25' are there deposited. The traverse beam 29 then retracts, the normal walking cycle having continued all during this traverse beam operation. The stepdown at d of FIG. 5, referred to previously, assures that only those extrusions designated 25' (see FIG. 2) will be advanced by the forward travel of the traverse beam 29, whereas if no such stepdown were present some of the extrusions 25 on the principal walking platform 27a—27b could be dragged forward by the traverse beam 29. It should also be noted that the stop gate 28 flips downwardly as shown in broken line in FIG. 5, at the appropriate point in the cycle so as to prevent the stop gate from dragging the already deposited extrusions 25" (see FIG. 2) back toward the walkover structure.

Thus, summarizing the sequence of the operation, by reference to FIG. 2, the normal walking structure of the composite walking beam moves extrusions 25 in a steady stepwise progression in the direction of the arrow, the extrusions eventually being moved as a group by the leading traverse beam 29 portion of the composite beam until the nested sequence of extrusions 25' is collected against the stop gate 28. The saw feed operator may then, by his own manual switch, energize the limit switches 61 and 62 so that the traverse beam 29 darts forward when the composite beam arrives near the upper limit of its walking cycle. The traverse beam 29 then deposits the extrusions 25' into the position as shown at 25" on the saw feed rollers 15, as the normal walk cycle progresses. The limit switch 62 then causes retraction of the traverse beam 29 to receive more extrusions 25 as the normal walking cycle continues uninterrupted.

It should be appreciated that the saw feed operator may call for additional extrusions at any time he so desires and also in any number he so desires merely by waiting until the required number of extrusions have collected on the traverse beam 29. He may even control their degree of nesting by appropriate timing of his request. He is, most importantly however, free all the while to complete his saw feed operation on the extrusions 25' without interdigitated interferring advance of the extrusions and their supporting structures from the crossover apparatus Those familiar with these types of aluminum extrusion handling devices will most fully appreciate the advantage inherent in this invention.

Accordingly we have described a transfer apparatus which includes a collecting and traversing structure extendible selectively to move and deposit collected objects such as extrusions to a separate conveyor structure moving the entire collected group of objects so collected in a direction transverse to the flow of collected objects.

Having thus described an operative embodiment of our invention, this description will suggest improvements, adaptations, modifications and substitutions to those skilled in the art and such improvements, adaptations, modifications and substitutions are intended to be included within the spirit of the present invention, limited only by the scope of the hereinafter appended claims.

We claim:

1. In a crossover walking beam transfer apparatus for conveying articles sidewise in continuous stepwise succession toward an article-receiving platform having separated article-supporting cross elements, and wherein the walking transfer apparatus is of the kind embodying at least one walking beam which is interdigitated between the article-supporting slats of a crossover table (elevated to the level of the platform) to rise above and below said slats during said walking cycle; a composite walking beam construction comprising: a traverse beam member mounted on said walking beam in parallel relation thereto for interdigitated movement with said walking beam, said traverse beam member being disposed for longitudinal advancement and retraction in the walking direction relative to said walking beam member, and means for selectively advancing and retracting said traverse beam relative to said walking beam member so as to effectuate an intermittent extension of said walking beam disposed interdigitally between the article support elements of said article receiving platform, thereby to extend temporarily the limit of the walking operation to said article receiving platform.

2. The apparatus of claim 1 wherein each said walking beam is provided with track means and said traverse beam is engaged therewith for forward and backward sliding traverse thereon, with respect to said main walking beam.

3. The apparatus set forth in claim 2, wherein the upper, article-supporting surface of said traverse beam is disposed at a lower level than that of the upper, article-supporting surface of the principal beam, on said composite walking beams.

4. The apparatus set forth in claim 3 with the additional structure comprising: an article stop gate near the free end of said traverse beam, to arrest articles advancing stepwise toward the end of said beam, said gate adapted to be dropped to a lower, nonoperational position, in response to actuation of said traverse beam.

5. The apparatus of claim 1 with the additional structure comprising reversible drive means for said advance and return of said traverse beam.

6. The apparatus recited in claim 5 wherein said traverse beam drive means comprise a reversible electric motor supported on said composite walking beam main frame, and a pinion gear driven by said motor and engaged with a rack on said traverse beam for transmission of traverse motion from said motor to said rack.

7. The apparatus set forth in claim 6 with the further limitation of control means comprising:

first limit switch means actuated by said walking beam to initiate the forward traverse motion of said traverse beam when the composite walking beam is approaching the upper limit of its cycle;

second limit switch means actuated near the forward limit of traverse of said traverse beam to initiate reversal of the traverse motion of said traverse beam, for return thereof; and third master switch means for energization and deenergization of said first and second limit switch means.

8. The apparatus of claim 7 with the additional limitation comprising: means for dropping said traverse beam stop gate below its normal article restraining position; in response to actuation of said first limit switch means, and restoring said gate to the said normal position in response response to actuation of said second limit switch means.

9. In a stepwise conveying process of lineally advancing articles toward a transversely directed receiving station, the method comprising:

advancing articles lineally toward said receiving station with an up and down stepwise movement;

collecting at a location laterally adjacent the receiving station a continuous set of the furthest progressed of said advancing articles while continuing to transfer other articles with an up and down stepwise movement;

moving said collected articles up and down in synchronism with the up and down movement of said other advancing articles;

selectively transporting laterally the entire said collected set of articles onto said receiving station during a single up and down cycle of their movement without interfering with the lineal advancement of said other articles; and repeating the above two sequences continuously, at time intervals selected to correspond to a condition of readiness of said receiving station.

UNITED STATES PATENT OFFICE
CERTIFICATE OF CORRECTION

Patent No. 3,565,241                    Dated February 23, 1971

Inventor(s)    Russell L. Race et al.

It is certified that error appears in the above-identified patent and that said Letters Patent are hereby corrected as shown below:

In the grant (only) insert columns 5, 6, 7 and 8 and cancel the last page.

5 walking motion to composite bean 23 at the main frame portion 27, thereof. Keyed to these shafts 35 are the chain sprockets 37 driven by chains 38. FIG. 2 also shows the main drive support structure which includes motor base platform 43 and shaft-bracing structure 44. In actual practice the main drive motor 41 may be substantially offset from the positions shown and centered between the sprocket shafts 35. In such case (not shown) the moor drive shaft is provided with a special sprocket and the shaft 40 is independently mounted as a jackshaft on the support 44, in the centered position; and an extra sprocket is provided on the jackshaft to be driven by a third chain (not shown) between it and the main drive motor 41. Whether this arrangement, or the one shown, is used is not of contributory importance to an understanding of the present invention.

The saw feed structure is supported on legs 31' and brackets 32'.

The FIG. 5 gives a less cluttered view of the subject matter of FIG. 2, with a chain drive motor structure removed as well as the proximate pair of legs 31; this reveals eccentrics 51 which are mounted to turn on shafts 35 inside the eccentric hanger housings 53. The hanger housing 53 depends from, and upwardly supports the main frame 27 of the composite beam, and it can readily be seen that rotation of shafts 35 (synchronized by virtue of their connection to common drive shaft 40) causes the eccentric housing 53 to describe a rotational motion while remaining in a fixed attitude, because the housing is freely rotatable about the eccentrically mounted member 51. Thus the composite beam 27 describes a substantially circular motion such that composite beam 27 oscillates between an advance and a retracted position; as well as an upper and lower position. This can be seen by reference to FIG. 4 (which shows the walking composite beam in its upper or raised position above the stationary slats 21 in heavy line) and FIG. 5 (which shows the lower or descended position

6 more efficiently and economically if the saw feed ta collect one or more extrusions in a bunch and then ope them in the same fashion without interference or inv; the saw feed table by the walking beam. Thus the beam may continue cycling and thereby advancing ext 25, yet not invading the saw feed table 13 and thereby it free for continuous uninterrupted saw operation unt predetermined time at which it is desired to transfer more of the extrusions 25' from the crossover apparatu saw feed table.

It is just this result that my invention accompli: providing a composite beam in two portions, the main 27 with upper support platform in two parts 27a and 2 FIG. 5) and a second extensible member 29 which n does not invade the saw feed table until such time desired by the saw feed operator to deliver additiona sions to the saw feed table rolls 15, which have pres been cleared to receive a new arrival of extrusions. Th is accomplished by a properly timed extension of the a portion 29 of the composite walking beam, when the s table 13 is prepared for an additional receipt of ext and at such time as the member 29 has collected a suffi desired number of extrusions 25', which normally wou been collecting in the nested relation shown in FIG. 2 the releasable stop gate 28 (shown projecting upward f end of the member 29).

The exact timing of the motion of the member 29 i lows: at some point when the composite structure 27a at, or very near, to the uppermost point of its walkin the member 29 is rapidly extended forwardly in a d shown by the arrow in FIG. 4, to the position there This relatively quick forward movement of the memt in the nature of a forward traverse and consequel member is referred to as a traverse beam 29. Advanc traverse bean 29 occurs through tripping of the trav

UNITED STATES PATENT OFFICE
CERTIFICATE OF CORRECTION

Patent No. 3,565,241  Dated  February 23, 1971

Inventor(s) Russell L. Race et al.  PAGE - 2

It is certified that error appears in the above-identified patent and that said Letters Patent are hereby corrected as shown below:

---

5 below the stationary slats 21 in phantom line). This up-down motion accompanied as it is by a simultaneous advance-retreat (back and forth) motion of the entire composite walking beam structure, clearly lifts any crosswise-disposed free objects from the slats 21, advances them some distance and then descends below the slats 21 to redeposit the objects on the crossover table, only to be again picked up and advanced a short step again as the walking cycle continues. Such a walking apparatus as thus far described is presently known to the conveyancing art.

In Fig. 4 is seen an extendible portion 29 of the main walking structure 11 which normally cycles in rigid conformance to the cycling of the main composite beam structure 27, as though it were an integral portion thereof. Assuming this condition it can be seen that the extensible portion 29 cycles up and down with respect to the saw feed table, to alternate positions above and below the upper surface of the rollers 15 thereof, as is clearly seen by the previous consecutive reference to FIGS. 4 and 5. FIG. 5 shows the extension or traverse beam 29 below the saw feed rollers 15. The saw feed table structure 13 is indented or otherwise open between rollers 15 so as to permit this invasion of the saw feed table area in the interdigitated fashion which may be best appreciated by reference again to FIG. 1 which also shows the extension member 29, in phantom line, between a pair of the saw feed table rolls 15. Thus, normal cycling of the apparatus as already described would normally advance extrusions 25 as seen in FIG. 2 continuously in the spaced-apart relation shown at 25 until they collect on the saw feed table 13 where they would normally still be spaced apart, unless nested by some backstop mechanism, or the like. It is precisely this fashion in which most known walking beam structures operate.

However, for reasons already described above in Background of the Invention, it is desirable to avoid the continuously interdigitated relation between the walking beam structure 11 and the object table or saw feed structure 13. The main consideration for desiring to eliminate this feature, is that the operator of the saw feed table may function much

6 vance switch 61 which is so mounted to leg 31 (or an such stationary structure) so as to be tripped by some portion of the composite beam structure such as the cc housing 53 (see FIG. 4). Reverse or withdrawal of the t beam 29 is initiated by contact of the traverse beam st (e.g. stop gate 28) with the reversing switch 62 mour the cable structure 13. Reversal is as shown in the direc the arrow in broken line in FIG. 5, as would be expect is delayed slightly so as to permit the walking cycle to completely below the upper surface of the rollers 15 the retraction of the traverse beam 29. This permits deposit of the articles, i.e. the extrusions 25", on the s: table 13 without a drag back of these members by the t member 29.

Moreover at the same time as the traverse member 2 mences to withdraw from the extension position, the st 28 is released to drop to the lower position as seen in Fl broken line. This drop-down of the stop gate 28 also against any drag back of the extrusions 25" from the platform, i.e., the rollers 15 of the saw feed table 13.

A separate reversible drive motor 63 for motivation traverse beam, is mounted on the hanger frame 65 fr main frame of the walking composite beam 27, to which supportably connected the traverse beam drive sprocke shaft 69. As will be appreciated other motors or lineal tors may be used such as hydraulic, pneumatic, or el direct drive systems well known in the art. This drive sp is driven off from the motor 63 by the drive chain 7 nected to the motor sprocket 72, the drive sprocket 67 a secondary pinion gear portion 73 which drives the t beam 29 to or fro by engagement with the rack portion t 75 (see FIG. 4). The shaft 69 extends to some indeter length in either direction from the drive sprocket struc as to connect up with other traverse beam members, d ing upon the width of the crossover table, which widt forms substantially to the length of the extrusion in being conveyed or transferred. Similarly of course, the ing shafts 35 extend away to connect with other con

UNITED STATES PATENT OFFICE
CERTIFICATE OF CORRECTION

Patent No. 3,565,241　　　　　　　　Dated February 23, 1971

Inventor(s) Russell L. Race et al.　　　PAGE - 3

It is certified that error appears in the above-identified patent and that said Letters Patent are hereby corrected as shown below:

7 walking beam structures (not shown) between other cross slats 21 on the crossover table, the number dependent upon the length of extrusions 25 served.

Details of the construction for driving the traverse beams are best appreciated by reference FIG. 6. The sprocket shaft 69 is seen journaled in ball bearing 77 which in turn are mounted in housings 78 attached to the movable main frame 27 of the composite beam structure. Drive pinion 73 is seen engaging the drive rack 75 on the bottom portion of the channel member 79 into which the traversing support beam 29 is attached. The extrusion-supporting portion of the walking beam is split into two mutually adjustable beam halves 27a and 27b, the second of which is tongue and groove fitted into the first and is slidable thereon, in a tracked fashion, to any desired point of extension and tightened thereat by the threaded restraining bolt and nut structure 81. One of these extendible members is slotted (not shown) in which slot the restraining bolt 81 moves to permit relative motion of the sliding member 27a with respect to the bolt 81. Comparison of the principal walking support member 27a —27b with the traverse beam 29, reveals a slight height differential therebetween (which can be seen by reference to any of the FIG. 1 through 6) which differential is deliberately provided so as to cause only the appropriate selected extrusions 25' to pass to the saw feed table 13 upon advance of the traverse beams 29.

Both the principal walking support beam 27a —27 b and the traverse beam 29 may have upper surfaces formed of a contact layer of graphite (not shown) if desired, so as to provide a superior surface for extrusions 25 which are still hot when received from the extruding dies.

Referring again to FIG. 6, it can be seen that the main frame of the walking beam structure is formed in a split box cross section which provides an appropriately sized and designed structure for supporting and partially partially housing the traverse beam drive sprocket 63, shaft 72, bearings etc., all of which must be supportably attached to the walking structure. Also provided upon the walking beam structure is a forward support roller 83 (see FIG. 4) upon which the forward portion of the traverse beam 29 rests in a level guide frictionless relation.

Both principal and traverse beam portions are of wood structures which are separably connected to the metal support channel members 78 and 80 respectively.

8

At the forward limit of the travel of the traverse b the stop gate 28 actuates the second limit switch 62 w itiates reversal of the traverse motion. Reversal is, h slightly delayed through appropriate circuitry so that return of the traverse beam does not occur until the cycle has dropped the beam below the upper surface saw feed rollers 15, as seen in FIG. 5, whereupon th sions 25' are there deposited. The traverse beam retracts, the normal walking cycle having continued all this traverse beam operation. The stepdown at d of referred to previously, assures that only those ext designated 25' (see FIG. 2) will be advanced by the travel of the traverse beam 29, whereas if no such st were present some of the extrusions 25 on the princip ing platform 27a —27b could be dragged forward traverse beam 29. It should also be noted that the stop flips downwardly as shown in broken line in FIG. 5, at propriate point in the cycle so as to prevent the stop ga dragging the already deposited extrusions 25" (see back toward the walkover structure.

Thus, summarizing the sequence of the operati reference to FIG. 2, the normal walking structure of th posite walking beam moves extrusions 25 in a steady s progression in the direction of the arrow, the extrusion tually being moved as a group by the leading traverse b portion of the composite beam until the nested sequ extrusions 25' is collected against the stop gate 28. feed operator may then, by his own manual switch, e the limit switches 61 and 62 so that the traverse beam forward when the composite beam arrives near the upp of its walking cycle. The traverse beam 29 then depo extrusions 25' into the position as shown at 25" on t feed rollers 15, as the normal walk cycle progresses. T switch 62 then causes retraction of the traverse bean receive more extrusions 25 as the normal walking cyc tinues uninterrupted.

It should be appreciated that the saw feed operator n for additional extrusions at any time he so desires and any number he so desires merely by waiting until the r number of extrusions have collected on the traverse b He may even control their degree of nesting by appr timing of his request. He is, most importantly however, the while to complete his saw feed operation on the ext 25' without interdigitated interferring advance of the sions and their supporting structures from the crosso

UNITED STATES PATENT OFFICE
CERTIFICATE OF CORRECTION

Patent No. 3,565,241      Dated February 23, 1971

Inventor(s)    Russell L. Race et al.     PAGE - 4

It is certified that error appears in the above-identified patent and that said Letters Patent are hereby corrected as shown below:

7

OPERATION

In operation one or more extrusions are alternately lifted and set down by the walking cycle in stepwise fashion proceeding in the direction of the arrow, and forming a group of extrusions 25 as seen in FIG. 2. Extrusions are, as already described, repeatedly picked up and set down at a somewhat advanced position so as to be forwardly stepped along on the permanent cross slats 21 of the walkover table structure 11. These slats are arranged in a parallel plurality, so as to form racklike stationary structures, the surfaces of which are normally adapted to receive hot extrusions without interacting with the hot metal, and may therefore be formed of graphite previously mentioned. This group of extrusions 25 eventually arrives one by one at the end of the principal walking platform 27b and transfers onto the traverse beam 29, which is seen at d in FIG. 5 to be slightly down stepped from the main walking platform 27a—27b, somewhere in the neighborhood of one-eighth inch to one-fourth inch, the purpose of this down step being pointed out below. Eventually these advancing extrusions, after passing onto the traverse beam 29, encounter the stop gate 28 on the end of the traverse beam 29, and as walking motion continues they step together into a nested relation of extrusions 25'. At the option of the saw feed table operator, a switch 61 (see FIG. 4) is tripped which upon the next up cycle of the walking beam apparatus initiates forward traverse of the beam 29 into the extended position shown.

8 paratus Those familiar with these types of aluminum e handling devices will most fully appreciate the advar herent in this invention.

Accordingly we have described a transfer apparatu includes a collecting and traversing structure extendih tively to move and deposit collected objects such as e> to a separate conveyor structure moving the entire c group of objects so collected in a direction transvers flow of collected objects.

Having thus described an operative embodiment o vention, this description will suggest improvements, tions, modifications and substitutions to those skilled i and such improvements, adaptations, modifications ; stitutions are intended to be included within the spir present invention, limited only by the scope of the hei appended claims.

We claim:

1. In a crossover walking beam transfer apparatus veying articles sidewise in continuous stepwise su toward an article-receiving platform having separated supporting cross elements, and wherein the walking apparatus is of the kind embodying at least one walki which is interdigitated between the article-supporting a crossover table (elevated to the level of the platform above and below said slats during said walking cycle, posite walking beam construction comprising a-traver member mounted on said walking beam in parallel thereto for interdigitated movement with said walkin Signed and sealed this 7th day of December 1971.

(SEAL)
Attest:

EDWARD M. FLETCHER, JR.          ROBERT GOTTSCHALK
Attesting Officer                    Acting Commissioner of Pat